Sept. 30, 1958     J. R. McCORDIC     2,853,896
REMOTE CONTROL FOR MULTIPLE SPEED TRANSMISSIONS
Filed May 14, 1954     3 Sheets-Sheet 2
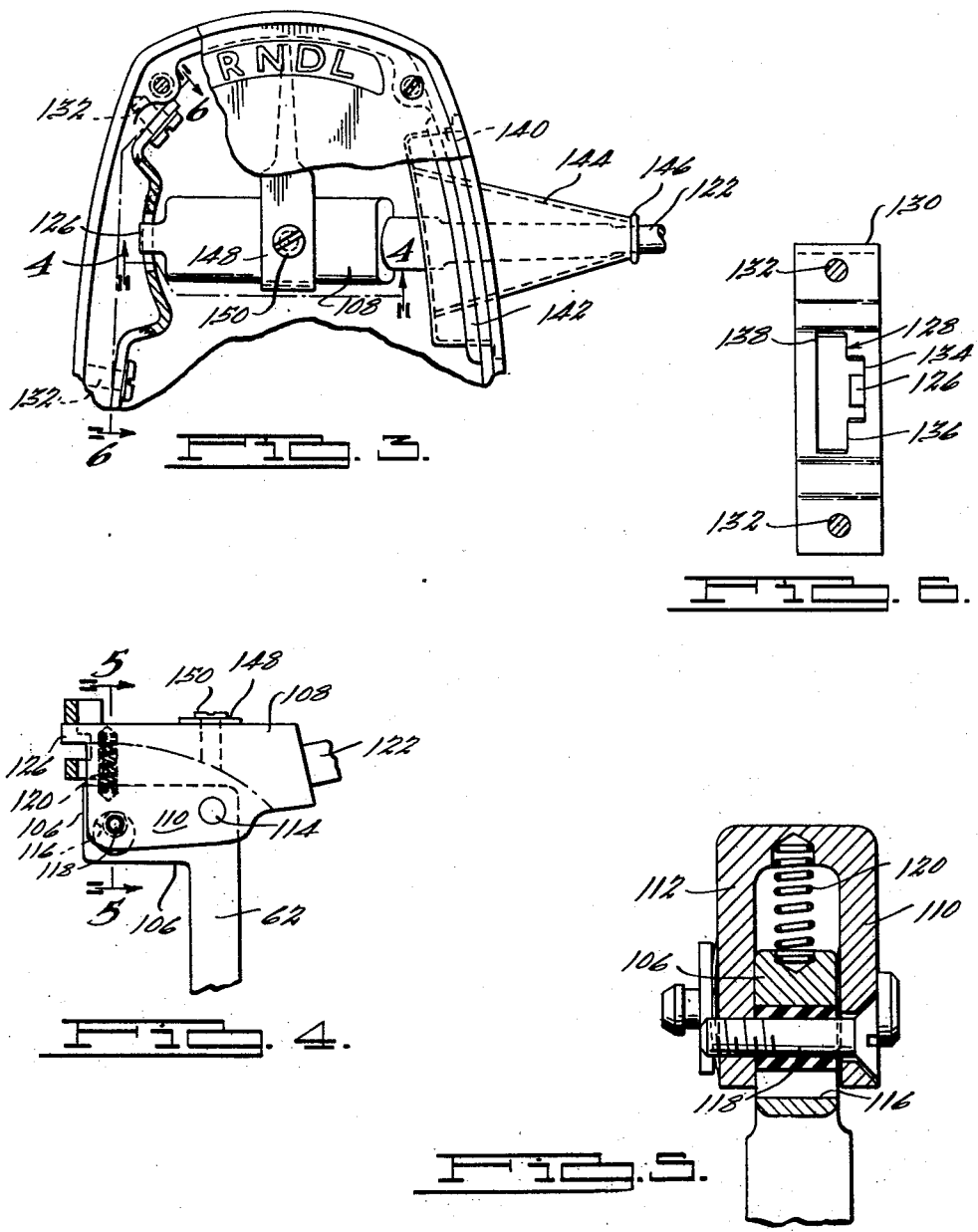
INVENTOR.
JAMES R. McCORDIC.
BY
ATTORNEYS

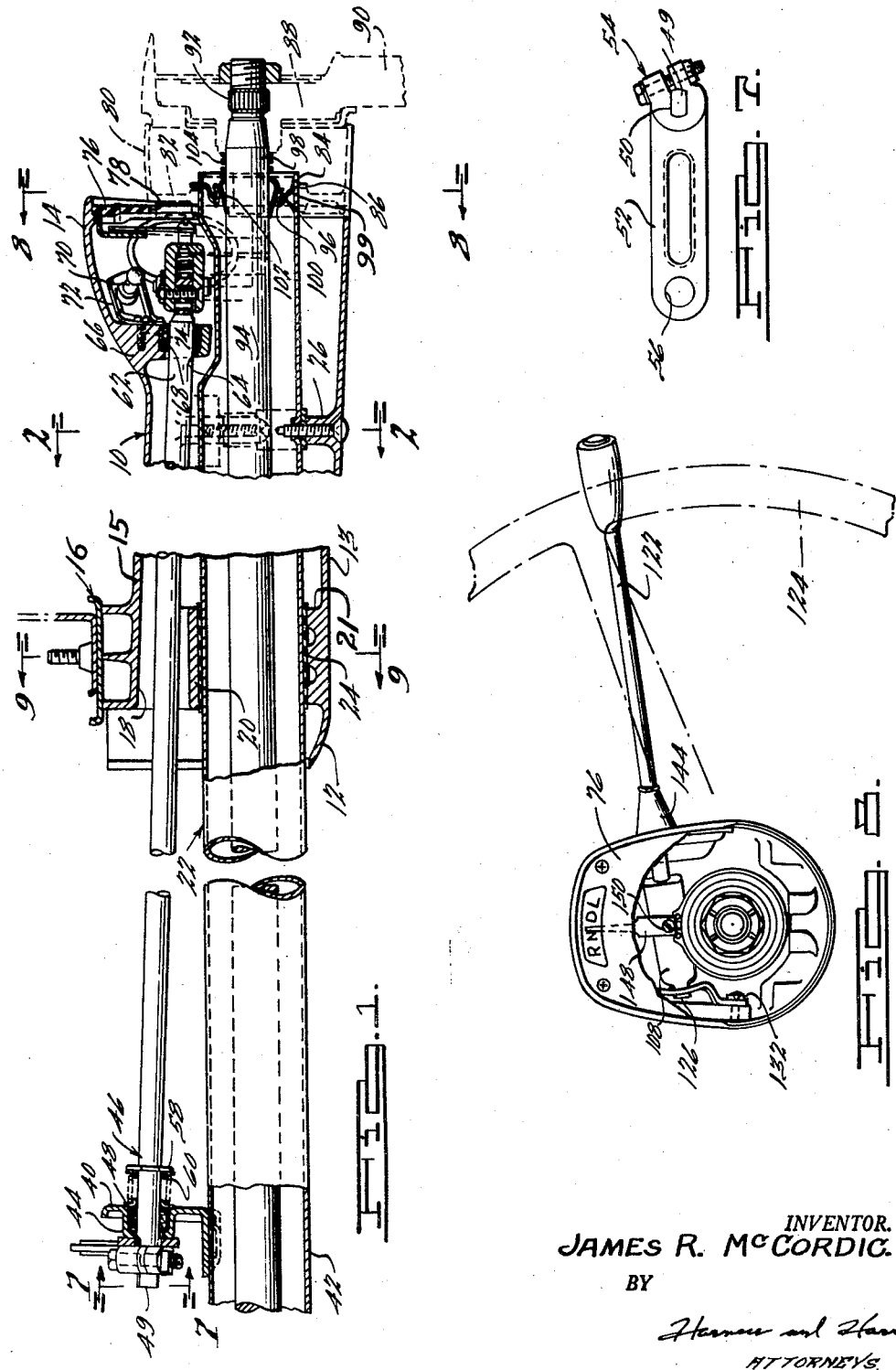

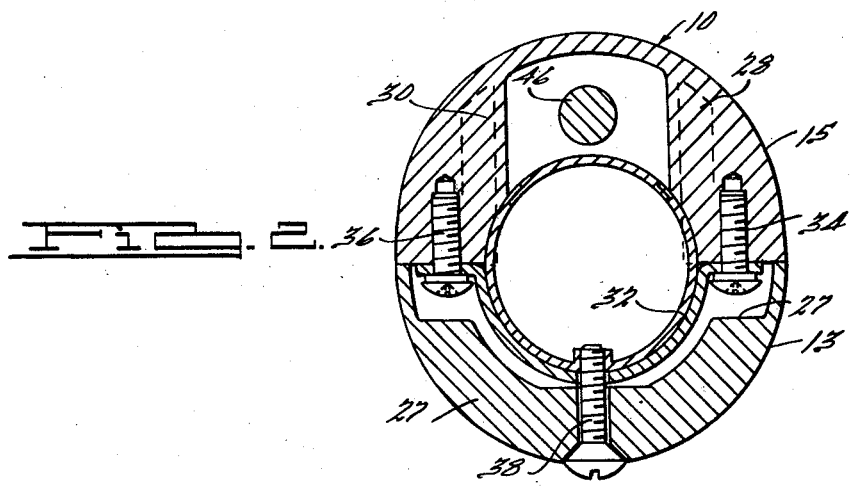
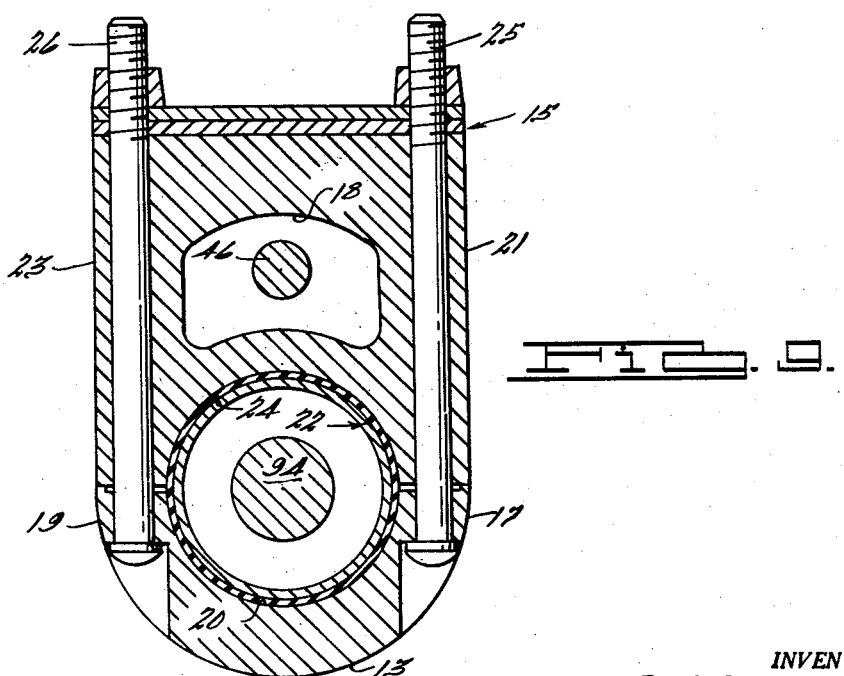

United States Patent Office 2,853,896
Patented Sept. 30, 1958

2,853,896

REMOTE CONTROL FOR MULTIPLE SPEED TRANSMISSIONS

James R. McCordic, Royal Oak, Mich., assignor to Chrysler Corporation, Highland Park, Mich., a corporation of Delaware Application May 14, 1954, Serial No. 429,777

9 Claims. (Cl. 74—485)

This invention relates generally to multiple speed transmission controls and more particularly to a transmission gearshift control mechanism. The present invention is particularly adapted to be used with automatic transmissions for automotive vehicles to control changes in transmission reduction gear ratios.

More specifically the transmission control mechanism of the present invention is adapted to be used for actuating the transmission shift control mechanism of an automotive transmission to obtain any of several predetermined operating reduction gear ratios as desired, although the invention is also capable of other uses.

Automatic transmissions adapted for use with automotive vehicles are generally provided with a control valve mechanism for controlling the delivery of fluid under pressure from a suitable source to clutch and brake servo mechanisms within the transmission assembly. These servo mechanisms are effective to control the movement of epicyclic gear elements within the transmission to produce a plurality of gear reduction ratios. The control valve mechanism usually includes a movable valve element, the operating position of which may be controlled to cause certain of the transmission servos to become selectively energized, as desired.

Accordingly, it is an object of the present invention to provide a transmission shift control mechanism for use on automotive type vehicles as set forth above which includes a manually actuated lever portion situated in a position remote from the transmission.

Another object of the present invention is to provide a gearshift control mechanism for use with an automotive vehicle having a conventional steering wheel post, steering column and steering wheel for controlling the directional variation of the vehicle wheels, wherein a manually actuated lever portion thereof is mounted within the passenger compartment of the vehicle under the steering wheel and wherein a column portion thereof is mounted upon portions of the steering post substantially parallel to the steering column.

Another object of the present invention is to provide a gearshift mechanism of the type set forth above wherein the column portion of the mechanism is disposed in spaced relationship with respect to said steering column and is formed with a diameter of relatively reduced size with respect to the magnitude of the steering column diameter.

Another object of the present invention is to provide a gearshift mechanism of the type set forth above wherein the lever portion of the mechanism is adapted to rotatably oscillate the column portion of the same, the remote end of the column portion being operatively secured to the movable valve element of the transmission shift control valve for effecting a shifting movement thereof, and wherein a detent means or gate is provided on the steering post adjacent the other end of the column portion for fixing the lever and column portion in certain predetermined angular positions which correspond to operative positions of the movable control valve element.

Reference will hereinafter be made to the accompanying drawings for the purpose of particularly describing the present invention wherein:

Figure 1 is a longitudinal cross sectional view of the present invention;

Figure 2 is a transverse sectional view taken along the section line 2—2 as shown in Figure 1;

Figure 3 is an enlarged sectional view similar to Figure 8, a portion of the gate member being broken away to show details of construction;

Figure 4 is a detailed assembly view showing the juncture between the column portion of the shift mechanism and the lever portion of the same;

Figure 5 is a sectional view taken along the line 5—5 of Figure 4;

Figure 6 is a detail view of the gate used to fix the angular position of the column and lever portion of the shift mechanism;

Figure 7 is a detail view of a lever element of the shift mechanism;

Figure 8 is a transverse view of the upper portion of the steering post taken along the section line 8—8 of Figure 1; and Figure 9 is a transverse sectional view taken along the section line 9—9 of Figure 1.

Referring first to the assembly view of Figure 1, a steering post outer housing structure for a conventional automotive vehicle passenger compartment is designated generally by numeral 10 and includes a generally cylindrical structure comprising two mating portions 13 and 15 and having a lower end 12 and an upper end 14. The lower end 12 may be adapted, as shown in Figures 1 and 9, to be secured to a suitable bracket structure 16 disposed in the proximate vicinity of the vehicle dash board structure within the vehicle passenger compartment. As shown more particularly in Figure 9, the housing portion 13 may be provided with bosses 17 and 19 and the housing portion 15 may similarly be provided with bosses 21 and 23 which may be formed with bolt holes as shown for receiving suitable bolts 25 and 26, respectively, said bolts serving to secure the lower housing end 12 to the bracket structure 16. The bolts 25 and 26 further serve to clamp the housing portions 13 and 15 into mating engagement.

The lower end 12 also includes a transversely extending integral wall portion 21 having a first axially extending aperture 18 formed therethrough and a second axially extending aperture 20 having a relatively larger diameter. A steering column 22 is received through the aperture 20 and it extends through the housing structure 10 to the upper end 14 thereof. An insulating material 24 may be provided within the aperture 20 for the purpose of reducing noise resulting from metal-to-metal contact between the column 22 and the wall portion 21 of the housing structure 12.

As best seen in Figure 2, the housing structure 10 includes an inwardly extending radial web portion 27 formed integrally with the housing portion 13, and a pair of symmetrically disposed shoulder portions 28 and 30 formed integrally with the other housing portion 15, the shoulder portions 28 and 30 being diametrically opposed to the web portion 27. A semi-circular supporting bracket 32 is disposed about the periphery of the column 22 and is secured at either end thereof to the shoulder portions 28 and 30 by means of bolts 34 and 36, respectively.

A threaded bolt 38 is threadably received through the web portion 27, as shown in Figures 1 and 2, for the purpose of securing the housing portion 13 against the mating housing portion 15 to supplement the clamping effort of the bolts 25 and 26 provided at the lower housing end 12.

A bracket structure 40 is integrally secured to the lower remote end portion 42 of the column 22, as shown in Figure 1, and it extends transversely therefrom. A recessed portion 44 is provided for receiving the lower end of a shifting column 46 and a suitable resilient bushing 48 may be received within the recess 44 for the purpose of providing insulation between the shifting column 46 and the bracket 40. The extreme end 49 of the shifting column 46 is provided with a pair of oppositely disposed flats 50 to provide an elongated cross sectional shape as shown in Figure 7. A transversely extending arm 52 is secured to the reduced end 49, as shown in Figure 7, by a bolted clamp means 54. The extended end of the arm 52 may be provided with an aperture 56 within which a transmission valve control lever may be secured.

An anchor ring 58 is secured to the shifting column 46 above the bracket 40, as shown in Figure 1, and is adapted to provide a seat for a spring 60 interposed between the bracket assembly and the anchor ring 58 for the purpose of biasing the shifting column 46 in an axial upward direction and for retaining the bushing 48 within the recess 44 of the bracket 40.

The shifting column 46 extends substantially parallel to the column 22 and is received within the aperture 18 or in the end portion 16 of the housing structure 12. The upper end 62 of the shifting column 46 is received within an aperture 64 formed in a supporting flange structure 66 which is integrally formed with the upper portion 14 of the housing structure 10 as shown in Figure 1. A suitable felt bushing 68 may be provided within the aperture 64 for the purpose of insulating the end 62 from the upper end portion 14.

The upper end portion 14 is formed with a bell-shaped configuration and is adapted to enclose the portions of the gearshift mechanism subsequently to be described. The upper end portion 14 also encloses an electrical lamp 70 which is supported by a suitable bracket 72 secured to the interior of the upper end portion 14 by suitable bolts 74. The open end of the end portion 14 is adapted to receive a suitable plastic end cover plate 76, as shown in Figures 1 and 8, for covering a portion of the substantially oval-shaped opening. One edge 78 of the plate 76, together with the edges of the uncovered periphery of the end portion 14, define a substantially circular opening, as shown in Figure 1. A substantially cylindrical cap 80 is adapted to be positioned over this circular opening and is supported in this position by means of an inner radial web 82 which is seated about the periphery of an upper end 84 of the column 22. A suitable snap ring 86 may be provided for the purpose of preventing relative axial movement between the cap 80 and the column 22.

The cap 80 constitutes a portion of a hub 88 for a conventional vehicle steering wheel, a portion of which is shown at 90 in Figure 1. The hub portion 88 of the vehicle steering wheel is splined at 92 to a steering shaft 94 which extends axially through the column 22 in concentric relationship therewith to a suitable vehicle steering linkage mechanism in the forward vehicle chassis structure, not shown. A suitable ball bearing support may be provided, as generally indicated at 96, at the upper end 98 on the steering shaft 94, as shown in Figure 1. The bearing 96 may comprise an outer bearing race member 99 and an inner race member 100 which is adapted to be biased radially by a wedge member 102. A spring 104 may be interposed between the wedge member 102 and one end of the steering wheel hub 88 for biasing the wedge member 102 in an axial direction.

Referring next to Figures 4 and 5, it is seen that the upper end 62 of the shifting column 46 is provided with an elbow extension 106 having a substantially rectangular-shaped cross section, as best seen in Figure 5. A lever element 108 is provided, as shown in Figures 4 and 5, with a pair of spaced parallel side walls 110 and 112 which define a substantially U-shaped cross sectional area as viewed in Figure 5. The parallel walls 110 and 112 are adapted to receive the extension 106 therebetween and is pivoted thereto by a pin 114 located substantially on the longitudinal axis of the shifting column 46. The extension 106 is provided with a transverse aperture 116 through which is received a bolt 118 extending from the wall 110 to the wall 112. The wall 112 may be provided with suitable threads for the purpose of receiving the threaded end of the bolt 118. A suitable rubber cylindrical bushing may be disposed about the central portion of the bolt 118 to prevent a metal-to-metal contact between the extension 106 and the bolt 118 and a spring 120 may be disposed between the extension 106 and the upper portion of the lever element 108 adjacent the aperture 116.

A manually operable gearshift lever 122 which is best seen in Figures 3, 4, and 8, is integrally secured to the lever element 108 and extends in a direction substantially perpendicular to the axis of the gearshift column 46 adjacent the plane of the vehicle steering wheel rim designated by numeral 124.

The lever portion 108 is provided with a finger element 126, as shown in Figure 4, which is adapted to be received within a slot 128 formed in a gate member 130. The gate member 130 may be enclosed by the upper end portion 14 of the housing structure 12 and may be secured to the side thereof by suitable bolts 132. The slot 128 comprises a relatively wide central portion 134 and relatively narrow end portions 136 and 138.

The side of the upper portion 14 of the housing structure 12 opposite from the end to which the gate 130 is secured is provided with an elliptical opening 140 within which the base 142 of a flexible rubber cover 144 is received. The cover 144 is substantially conical in shape and it contacts the lever 122 at the vertex thereof, as shown at 146, and is effective to prevent dust and dirt from entering the aperture 140.

A pointer 148 is secured to the lever portion 108 by means of a set screw 150, as best seen in Figures 1, 3, and 8, and it extends in a direction substantially transverse to the axis of the gearshift column 46, the terminal portion of the pointer 148 being adjacent the inner face of the plastic plate 76.

In the operation of the gearshift mechanism of the present invention the operator of the vehicle may actuate the gearshift lever 122 and oscillate the same in a plane which is parallel to the plane of the steering wheel rim 124 thereby causing the gearshift column 46 to correspondingly oscillate about its longitudinal axis. The oscillatory motion of the gearshift column 46 will cause a corresponding oscillatory movement of the arm 52 secured to the end 49 of the column 46. The movement of the extended end of the arm 52 may cause movement of a link member secured within aperture 56 thereby actuating the transmission gearshift control valve previously described. The gate 130 is effective to restrict movement of finger 126 during the angular movement of the gearshift lever 122. The spring 120 is effective to urge the finger 126 against the upper edge of the slot 128 as viewed in Figure 4, which corresponds to the right hand edge of the slot 128 as viewed in Figure 6. If for example, the operator of the vehicle desires to initiate a shift from neutral to forward drive the gearshift lever 122 may be rotated until the finger 126 on the lever element 108 contacts the lower shoulder of the enlarged portion 134 of the slot 128 formed in the gate 130 as viewed in Figure 6. The transmission may be returned to neutral by rotating the gearshift lever 122 until the finger 126 contacts the upper shoulder of the enlarged slot portion 134 as viewed in Figure 6.

To shift the transmission from neutral to reverse drive, it is necessary to raise the gearshift lever 122 so as to rotate the lever element 108 about the pin 114 in a counterclockwise direction as viewed in Figure 4. This will cause the finger 126 to move to the opposite edge of the slot 128 and upon a subsequent rotary movement of the gearshift lever 122, finger 126 will be shifted to the narrow portion 136 of the slot 128. This subsequent rotary movement of the gearshift lever 122 corresponds to a counterclockwise movement thereof as viewed in Figure 8.

In order to shift the transmission from forward drive to "low" gear, the gearshift lever 122 may be raised until the finger 126 contacts the opposite edge of the slot 128 and it may then be rotated in a clockwise direction as viewed in Figure 8 until the finger 126 is received within the narrow portion 138 of the slot 128. The gate 130 is thereby effective to prevent an inadvertent shifting movement of the gearshift lever into the "low" or into the reverse gear position.

The aperture 116 formed in the extension 106 has a relatively large diameter in comparison with the diameter of the bushing 118 thereby accommodating the shifting movement of the bushing 118 during relative angular movement between the lever element 108 and the extension 106.

The location of the gate 130 at the upper end of the steering wheel post considerably reduces the magnitude of the maximum torsional stress to which the shifting column 46 may be subjected. Accordingly, the diameter of the column 46 may be reduced to a relatively small magnitude since the required torsional rigidity thereof is determined only by the resistance offered by the movable valve element of the transmission control valve.

It is contemplated that the gearshift mechanism of the instant invention may be used for controlling the gear shifting operation for a variety of different types of vehicle transmission. Further, it is apparent that various modifications may be made to the presently described preferred embodiment without departing from the scope of the invention as defined by the following claims.

I claim:

1. In a gear shift control mechanism for a multiple speed transmission adapted for use with a wheeled vehicle, said vehicle having a vehicle wheel steering mechanism including a steering wheel post structure and a manually actuated steering column rotatably disposed therein; a gear shifting column rotatably mounted upon said post structure adjacent said steering column, a manually operable gear shift lever pivotally mounted upon one end portion of said gear shifting column at a point adjacent one end thereof, a gate structure secured within said post structure adjacent said one end portion of said gear shifting column including a plurality of shoulder portions disposed at angularly spaced positions about the central axis of said shifting column, a portion of said one end of said gear shift lever being adapted to contact said shoulder portions for limiting the degree of angular rotation of said shifting column, and a link means for operatively connecting the other end portion of said shifting column with portions of said transmission.

2. In a gear shift control mechanism for a multiple speed transmission adapted for use with a wheeled vehicle, said vehicle having a vehicle wheel steering mechanism including a steering wheel post structure and a manually actuated steering column rotatably disposed therein; a gear shifting column rotatably mounted upon said post structure adjacent said steering column, a manually operable gear shift lever pivotally mounted upon one end portion of said gear shifting column at a point adjacent one end thereof, and a gate structure secured to said post structure adjacent said one end portion of said gear shifting column including a plurality of shoulder portions disposed at angularly spaced positions about the central axis of said shifting column, a portion of said one end of said gear shift lever being adapted to contact said shoulder portions for limiting the degree of angular rotation of said shifting column, said gear shift lever being adapted to be rotatably oscillated in a plane substantially parallel to the plane which contains the central axis of said shifting column and being further adapted to be rotatably oscillated in a plane transverse to said central axis.

3. The combination as set forth in claim 2 wherein certain of the shoulder portions of said gate structure are displaced from other shoulder portions thereof in the direction of the central axis of said shifting column.

4. In a gear shift control mechanism for a multiple speed transmission adapted to be used with a wheeled vehicle, said vehicle having a vehicle wheel steering mechanism including a steering wheel post structure and a manually actuated steering column rotatably disposed therein; a gear shifting column rotatably mounted upon said post structure adjacent said steering column, a manually operable gear shift lever pivotally mounted upon one end portion of said gear shifting column at a point adjacent one end thereof, a gate structure secured within said post structure adjacent said one end portion including a plurality of shoulder portions disposed at angularly spaced positions about the central axis of said shifting column, a portion of said one end of said gear shift lever being adapted to contact said shoulder portions for limiting the degree of angular rotation of said shifting column, said one end portion of said gear shifting column comprising a transversely extending elbow extension, said gear shift lever being adapted to be rotatably oscillated in a plane substantially parallel to the plane which contains the central axis of said shifting column and adapted to be rotatably oscillated in a plane transverse to said central axis, certain of the shoulder portions of said gate being displaced from other shoulder portions thereof in the direction of the central axis of said shifting column, the said one end of said gear shift lever including portions disposed adjacent said elbow extension, and a lost motion connection between said elbow extension and said adjacent shift lever portions for accommodating relative angular movement between said shift lever and said shifting column and for limiting the same to a predetermined value.

5. The combination as set forth in claim 4 wherein said lost motion connection includes an aperture extending through said elbow extension, a pin secured to said adjacent shift lever portion and extending through said aperture, and a resilient bushing disposed about said pin.

6. The combination as set forth in claim 5 wherein a spring means is interposed between said elbow extension and said one end of said gear shift lever for biasing the said portion of the end of said gear shift lever about an axis transverse to said central column axis.

7. In a gear shift control mechanism for a multiple speed transmission adapted for use with a vehicle, said vehicle having a steering mechanism comprising a steering wheel post structure and a manually actuated steering column rotatably disposed therein; a gear shift column rotatably mounted upon said post structure adjacent said steering column, a manually operable gear shift lever, means for mounting said gear shift lever intermediate the ends thereof adjacent one end portion of said gear shifting column, a gate structure secured to said post structure adjacent said one end portion of said gear shifting column including a plurality of shoulder portions disposed at angularly spaced positions about the central axis of said shifting column, a transverse extension formed on said one end portion of said gear shifting column, one end of said gear shift lever being adapted to engage said gate structure, the other end of said gear shift lever being adapted to be rotatably oscillated about said gear shift lever mounting means in a plane which contains said gear shifting column axis and in a plane transverse to said gear shifting column axis, and a lost motion connection between said transverse shifting column extension and said gear shift lever to accommodate oscillatory movement of said gear shift lever about said gear shift lever mounting means in either of opposite directions, said gear shift lever being adapted to rotate said gear shift column upon oscillatory movement of the same in said transverse plane.

8. The combination as set forth in claim 7 wherein certain of the shoulder portions of said gate structure are displaced from other shoulder portions thereof in the direction of said shifting column axis, and wherein said one end of said gear shift lever is adapted to be moved between said certain shoulder portions and between said other shoulder portions upon movement of said other gear shift lever end in one and in the other of said opposed directions respectively, said shoulder portions thereby limiting the degree of movement of said gear shift lever in said transverse plane.

9. The combination as set forth in claim 7 wherein said lost motion connection includes a spring means interposed between said gear shifting column extension and said gear shift lever for normally biasing the latter in one of said opposed directions.

References Cited in the file of this patent

UNITED STATES PATENTS

| | | |
|---|---|---|
| 928,727 | Wolf | July 20, 1909 |
| 2,009,591 | Radford | July 30, 1935 |
| 2,171,953 | Seaholm | Sept. 5, 1939 |
| 2,231,742 | Witzke | Feb. 11, 1941 |
| 2,599,773 | Neracher et al. | June 10, 1952 |